United States Statutory Invention Registration [19]

[11] Reg. Number: H32

Kartik et al. [45] Published: Mar. 4, 1986

[54] STUD HARDWARE WITH SELF-CONTAINED STUD ANTI-ROTATION FEATURE AND METHOD OF INSTALLING STUDS

[75] Inventors: John S. Kartik; William M. Richardson, both of Pittsburgh, Pa.

[73] Assignee: The United States of America as represented by the United States Department of Energy, Washington, D.C.

[21] Appl. No.: 589,279

[22] Filed: Mar. 14, 1984

[51] Int. Cl.[4] ..... F42B 39/10
[52] U.S. Cl. ..... 411/120; 29/526 R
[58] Field of Search ..... 411/120, 424, 386, 119, 411/123, 122, 124, 148, 149, 136, 137, 138, 139, 537, 538

[56] References Cited

U.S. PATENT DOCUMENTS

| | | | |
|---|---|---|---|
| 124,644 | 3/1872 | Cleve | 411/123 |
| 292,513 | 1/1884 | Shailer | 411/138 |
| 514,315 | 2/1894 | Frenot | 411/116 |
| 525,431 | 9/1894 | Sparks | 411/120 |
| 618,436 | 1/1899 | Parker | 411/149 X |
| 1,088,515 | 2/1914 | Bazin | 411/120 |
| 2,295,466 | 9/1942 | Hafele | 411/120 |
| 2,537,527 | 1/1951 | Heckert | 411/119 X |
| 2,561,224 | 7/1951 | Pischek et al. | 411/120 |
| 3,386,771 | 4/1968 | Verdier et al. | 411/537 X |

FOREIGN PATENT DOCUMENTS

| | | | |
|---|---|---|---|
| 127799 | 6/1919 | United Kingdom | 411/119 |
| 464237 | 12/1968 | Switzerland | 411/424 |

OTHER PUBLICATIONS

British Patent Publ. "Class 89(i), Bolts & C", Dec. 18, 1926.

*Primary Examiner*—Harold J. Tudor
*Attorney, Agent, or Firm*—Judson R. Hightower

[57] ABSTRACT

Disclosed herein is a method and apparatus for preventing the rotation of a stud member during preloading. The apparatus comprises a stud member having a shaft portion extending into the member to be clamped and a hex or double hex portion carrying a locking nut. Extending outward from the hex or double hex portion of the stud there is a threaded portion carrying a nut which is torqued to preload the stud. Between the locking nut and the member to be clamped is a locking ring which engages the locking nut to prevent the stud from rotating during preloading.

Also disclosed is a method of preloading a stud without the use of an external restraint to prevent the stud from rotating when a torque is applied.

21 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

STUD HARDWARE WITH SELF-CONTAINED STUD ANTI-ROTATION FEATURE AND METHOD OF INSTALLING STUDS

The U.S. Government has rights in this invention pursuant to Contract No. DE-AC11-76PN00014 between the U.S. Department of Energy and Westinghouse Electric Corporation.

BACKGROUND OF THE INVENTION

1. Field of the Invention

The present invention relates to studs and to associated stud hardware. More particularly, the present invention relates to stud hardware with a self-contained anti-rotation feature.

2. Background of the Invention

A stud as used herein is essentially a threaded rod which may have a head portion on one end and which is assembled into a tapped hole, the other end receiving a nut. Alternatively, the stud may have two head portions with the member(s) to be clamped positioned therebetween. In order to properly secure a stud from becoming loose, it or its associated nut must be tightened so that at normal torque, compressive, and tensile loads, and in the temperature range to be experienced, it has been sufficiently preloaded to obviate an accidental loosening. Several ways have been devised for applying a preload to a stud. Two ways of effecting a preload on a stud involve the application of a tensile or torque load. The stud may be stretched by use of hydraulics or other mechanical or thermal means and the nut threaded down to bottom onto the fastened part. An alternative method is purely manual and involves holding the stud stationary while the nut is torqued to a predetermined value or rotated through a set distance.

When torque is applied to the nut to effect stud preload two operators are usually required, especially when the desired preload is high. A first operator must turn the nut while the other restrains the stud from rotation. For rare situations, when the correct physical conditions exist, the operator securing the stud from rotation can be eliminated by "blocking" the end of the wrench securing the stud to a stationary object. In the majority of cases, however, this is not possible.

In addition, in prior designs, problems arose when high torque preloads were required or when studs were not perfectly aligned in the holes of the part to be fastened or when the rotational orientation of the stud was crucial based upon the required "stack-up" height or based upon the stud bottom thread shear strength.

U.S. Pat. No. 514,315 to L. D. Frenot discloses a lock nut used in association with a bolt having both right and left hand screw thread extending along a side of two nuts provided with right and left screw threads, respectively, which are adapted to fit the corresponding threads on the bolt. The nuts have indents and detents so that when securely mated, they will cooperate to hold each other against rotation. Such an arrangement may require as many as three operators to install, requires complicated machinery and customized threading of the bolt. The hardware is expensive and requires an excessive amount of intensive work to install accurately, and consistently in those applications where many such bolt-nut combinations must be installed.

In U.S. Pat. No. 2,295,466 to J. Hafele there is disclosed a bolt and nut connection which is secured against rotation by a washer having a projection which keys into the work piece being held by the bolt. A plate is used which must be constructed with a resilient washer portion with an opening shaped to fit that of the nut or other fastening element which is secured onto the bolt. The washer or plate must be provided with ribs which engage corresponding ribs on the washer in such a way as to restrain the washer and plate from separating. The invention, therefore, requires many precision parts which require very specialized construction and which require the excessive expenditure of valuable skilled labor time on the part of two operators to properly install.

Neither of these references discloses any means for preloading studs or an effective and efficient way to repetitively preload large numbers of studs.

SUMMARY OF THE INVENTION

It is therefore an object of the present invention to provide a stud rotation restraint.

It is a further object of the present invention to provide a stud rotation restraint which requires only one operator to properly install.

It is a further object of the present invention to provide a stud and associated hardware design which has the ability to prevent stud rotation even under very demanding installation and service requirements.

It is a still further object of the present invention to provide a simple, cost effective method of and hardware for installing studs which is effective and efficient where a large number of studs must be preloaded repetitively.

In order to achieve these and other objects and in accordance with the present invention as embodied and broadly described herein, there is provided a stud and associated hardware for stud rotation restraint which requires only a single operator and which does not rely upon an appropriate object to restrain the end of a wrench engaging the stud. The design of the present invention is cost effective, especially where a large number of studs must be preloaded repetitively, since labor savings would outweigh the initial manufacturing costs. When space restrictions exist, the stud and hardware of the present invention is attractive since the operator required to restrain the stud is eliminated, thereby facilitating the joint preloading operation.

The apparatus of the invention comprises a stud member having a shaft portion extending into the member to be clamped which may carry on one or both ends a hex (or double hex or similar configuration) portion for carrying a hex (or double hex similar configuration) locking nut and a threaded portion for carrying a nut to which a torque is to be applied. Between the locking nut and the member to be clamped is a locking ring which engages the locking nut to prevent the shaft from rotating when the stud is being preloaded.

The locking nut and locking ring are provided with cooperating serrated teeth provided on their opposing faces.

Preferably but not necessarily, the opposing faces of the nut and the locking nut are mating spherical radii to reduce nut to stud thread binding.

Preferably the locking ring is set in a groove in the member to be clamped. It may be spot faced on the member to be clamped or the stud holes may be recessed in a counter bore in the clamped member with the locking ring sized to fit snugly in the counter bore.

For some applications the locking ring may preferably be a simple square, oval or other shaped plate member instead of a ring member forming a circular pattern as would be used for instance for clamping a standpipe extension to a closure head.

The anti-rotation stud and associated hardware design of the present invention has the ability not only to prevent stud rotation, but also to do so when high torques are required, or when studs are not perfectly aligned in the holes provided in the part to be fastened. In addition, the invention is effective when the rotational orientation of the stud is critical based on required stackup height or stud bottom thread shear strength based on the bottom thread length engagement.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1:
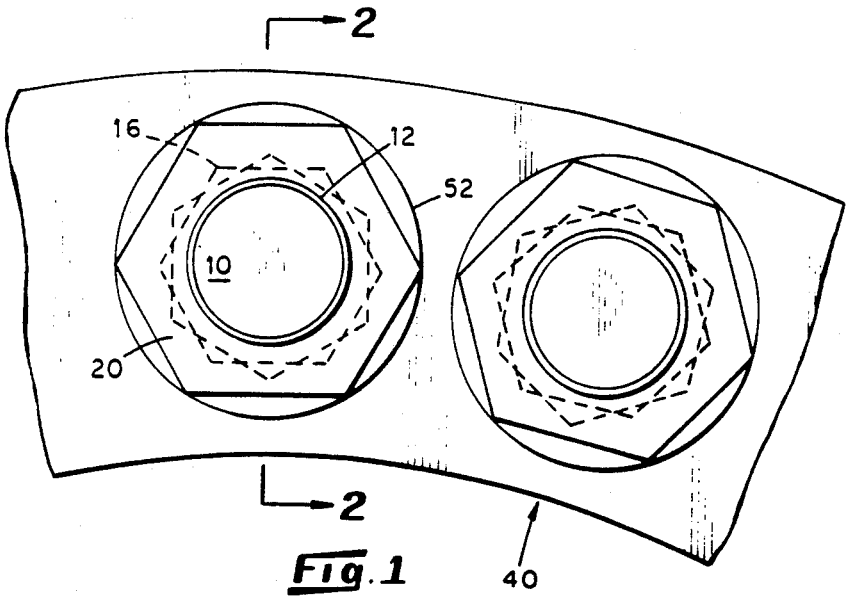
FIG. 1 is a top, fragmentary view of the stud anti-rotation device and the associated hardware.
Figure 2:
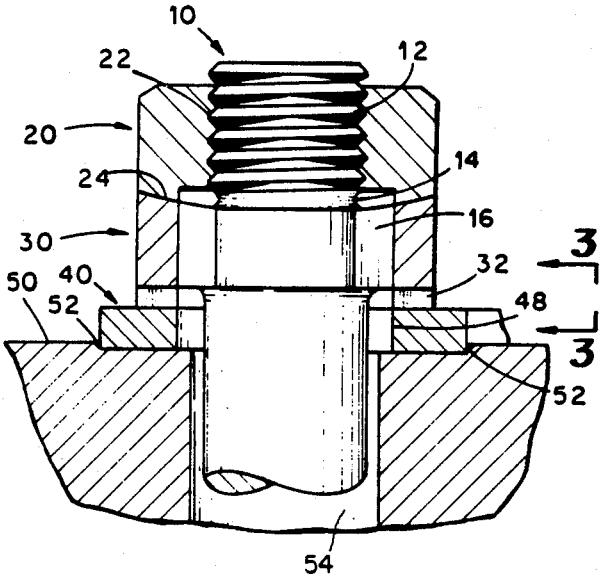
FIG. 2 is a sectional side elevation through section A—A of FIG. 1 of the stud anti-rotation device and associated hardware of the present invention.

Reference will now be made in detail to the present preferred embodiment of the invention, an example of which is illustrated in the accompanying drawings. As depicted in FIGS. 1 and 2, a stud 10 is provided which has an upper threaded portion 12, below which is machined, or otherwise provided, a circumferential groove 14. The stud member further includes a hexagon 16 which is preferably machined and which as explained hereinbelow is engaged by a locking nut 30. Clearly, stud head geometries other than hexagonal can be employed within the spirit and scope of the invention.

A locking ring 40 preferably having a circular or other shaped seat portion is provided through which the stud member 10 passes. The locking ring 40 sits on the member 50 to be clamped. The locking ring 40 can be positioned spot faced on the member 50 or may be snugly positioned in the countersunk bore 52 of the bore 54. A hole 48 is provided in the locking ring 40 through which the stud 10 member passes.

Figure 3:
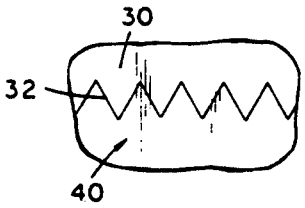
FIG. 3 is an enlarged side view, viewed from B—B of FIG. 2, showing the serrated locking nut and locking ring of the present invention.

The bottom of the locking nut 30 and the top of the locking ring 40 engage at a surface 32 as best viewed in FIG. 3. This surface preferably is formed by a pair of complementary serrations provided along the bottom surface of the locking nut 30 and a portion of the top surface of the locking ring 40.

It should be understood that mating configurations other than complimentary serrations can be used to form the locking surface 32. Simple indent/detent pairs or serrations on only one surface engaged by one or more ribs on the other surface can also be used. Other configurations will readily suggest themselves to the artisan and are within the spirit and scope of the invention.

In any event, the serrations, or other surfaces, restrain the locking nut 30 which in turn restrains the stud member 10 from rotating as the nut 20 is torqued.

The nut 20 threadingly engages the upper threaded portion 12 of the stud member 10 by means of a central threaded portion 22. The nut 20 preferably has a flange like portion that forms an annular ridge 24 which engages the locking nut 30.

As briefly mentioned above, the locking ring 40 is set in a groove or countersunk bore 52 on the member to be clamped 50 or the locking ring 40 may simply be spot faced onto the clamped member 50. When the stud holes 54 are recessed within a countersunk bore 52 within the clamped member 50, the locking ring outer diameter may be sized for minimal clearance with the countersunk bore 52 to provide restraint, i.e., due to the snug fit.

For applications where the stud member 10 has appreciable length, mating spherical radii on the bottom of the nut 20 and top of the locking nut 30 may be provided for reducing nut 12 to stud 22 thread binding.

As will be appreciated by the artisan, depending upon material and torquing requirements, the hexes on the stud member 16, the nut 20 and the locking nut 30 may be doubled on configurations other than hexes may be used.

In addition, the section of the locking ring 40 as shown in FIG. 1 depicts a circular stud pattern. For a single stud, a locking plate which is square or oval or any other convenient shape may be utilized. Such a locking plate should, of course, contain serrations similar to those discussed above with respect to the locking ring so that the anti-rotation feature can be achieved. It should also be appreciated that stud patterns other than circular can be achieved as necessary by simply modifying the shape of the locking "ring" to accommodate the desired stud pattern.

Preferably, the serrations on the locking nut 30 and locking ring 40 are 60° included angle teeth. This provides maximum strength. Tooth depth is selected as required based upon torque and material requirements. The locking ring and locking nut faces which contain serrations are generally circular with the serrations (or other engaging surfaces) radiating outward such that the serration (or other engaging surface) has a larger cross-section at the outside radius than at the inside radius. With other types of key members that might be employed, for instance where the torque requirements are low, such geometry may not be required.

However, the serrated locking design is more beneficial than a key to key way locking method for several reasons. First, there is the inherent strength of the tooth form. Secondly, the serration design has the ability to engage the stud even when it is not perfectly centered within the locking ring 40 and the hole 54 in the clamped member 50. Thirdly, the locking nut/locking ring serrations have the ability to engage each other at a multitude of locking nut to stud hex rotational orientations. This third advantage is quite significant when the stud bottom thread engagement length is crucial based upon stackup height limitations or thread shear considerations.

In operation the locking ring 40 or similar member is placed to register with bores 54 in the clamped member 50 as described hereinabove. A stud member is then placed into the bore 54 through the locking ring at which time the entire stud is rotated to engage a lower threaded member (not shown) in the clamped member. A locking nut 30 is fitted onto the hex portion 16 of the stud 10 and a nut 20 is threaded onto the upper thread portion 12 of the stud member 10. The nut 20 is tightened until it engages the locking nut 30. The operator simply continues to tighten the nut/stud combination while the nut 20, locking nut 30 and locking ring 40 engage; the locking nut and locking ring engaging at serrated surface 32. At that point, the proper preload torque may be applied and the stud being securely clamped to the member 50 and restrained against rotation by the locking nut and locking ring.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, the embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. An apparatus to prevent rotation of a stud comprising:

a stud member having a first portion adapted to engage a nut, a second portion adapted to receive a second locking member and a shaft portion adapted to engage a member to be clamped;

a first locking member adapted to be positioned on said member to be clamped;

a second locking member which cooperates with said second portion of said stud and said first locking member;

a nut which engages said first portion of said stud.

2. The apparatus according to claim 1, wherein said first portion of said stud is threaded.

3. The apparatus according to claim 2, wherein said second portion of said stud has the configuration of a single hex or a double hex.

4. The apparatus according to claim 1, wherein said first locking member is positioned to receive said shaft portion through a hole therein and has a surface adapted to face away from said member to be clamped, said surface having thereon means to engage said second locking member.

5. The apparatus according to claim 4, wherein said means to engage said first locking member are serrations.

6. The apparatus according to claim 5, wherein said serrations are radially disposed on said first locking member with respect to said hole therein.

7. The apparatus according to claim 3, wherein said second locking member has a hole therein shaped to engage said one of hex or double hex portions of said stud and has a first surface facing said nut and a second surface facing said first locking means, said second surface having means to engage said first locking member.

8. The apparatus according to claim 7, wherein said means to engage said first locking means are serrations.

9. The apparatus according to claim 8, wherein said serrations are radially disposed on said second locking member with respect to said hole therein.

10. The apparatus according to claim 7, wherein said first surface is rounded.

11. The apparatus according to claim 1, wherein said first portion of said stud is threaded and said nut has a threaded bore to engage said stud.

12. The apparatus according to claim 11, wherein said nut has a first side engaging said second locking member, said side further having an annular ridge for engaging a surface of said second locking means.

13. The apparatus of claim 12, wherein said annular ridge has a rounded surface.

14. A method of preloading a stud and preventing the rotation thereof comprising:

positioning a first locking member over a bore in a member to be clamped;

inserting a stud member having a first portion to engage a nut member and a second portion to engage a second locking member in register with said bore in said member to be clamped;

arranging said second locking member having a means for engaging said first locking member on said second portion of said stud;

threading said nut member onto said first portion of said stud;

preloading said stud by applying a torque to said nut member.

15. The method of claim 14, whereby said stud is preloaded while no separate restraint is applied to said stud.

16. The method of claim 15, wherein said first locking member and said second locking member have cooperating serrations thereon, said serration being operable to restrain said stud from rotation during said preloading.

17. The method of claim 16, including the step of placing said first locking means in a groove portion provided in said member to be clamped.

18. The method of claim 16, including the step of sizing said first locking means to snugly fit said groove portion.

19. The method of claim 16, further including spot facing said first locking member on said member to be clamped.

20. The method of claim 16, including the step of providing said second locking means and said nut member with opposing rounded faces.

21. The method of claim 16, including the step of providing said cooperating serrations in the form of angled teeth having an included angle of on the order of 60°.

* * * * *